(12) United States Patent
Rodriguez-Herrera et al.

(10) Patent No.: US 11,451,312 B2
(45) Date of Patent: Sep. 20, 2022

(54) MOBILE-ASSISTED PHASE CALIBRATION METHOD AND SYSTEM

(71) Applicant: Spirent Communications, Inc., San Jose, CA (US)

(72) Inventors: Alfonso Rodriguez-Herrera, Denton, TX (US); John Douglas Reed, Arlington, TX (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 17/364,703

(22) Filed: Jun. 30, 2021

(65) Prior Publication Data

US 2022/0006537 A1 Jan. 6, 2022

Related U.S. Application Data

(60) Provisional application No. 63/047,894, filed on Jul. 2, 2020.

(51) Int. Cl.
*H04B 17/12* (2015.01)
*H04B 7/06* (2006.01)

(52) U.S. Cl.
CPC .............. *H04B 17/12* (2015.01); *H04B 7/06* (2013.01)

(58) Field of Classification Search
CPC .................................. H04B 17/12; H04B 7/06
See application file for complete search history.

(56) References Cited

U.S. PATENT DOCUMENTS

| | | | |
|---|---|---|---|
| 8,331,869 B2 | 12/2012 | Foegelle | |
| 9,246,607 B2 | 1/2016 | Reed et al. | |
| 10,684,318 B1* | 6/2020 | Kyrolainen | H04B 7/0617 |
| 2003/0236089 A1* | 12/2003 | Beyme | H04W 24/00 455/423 |
| 2006/0148429 A1 | 7/2006 | Inogai et al. | |

(Continued)

OTHER PUBLICATIONS

3rd Generation Partnership Project; Technical Specification Group Radio Access Network; NR; User Equipment (UE) conformance specification; Radio transmission and reception; Part 4: Performance requirements (Release 15), 3GPP TS 38.521-4 V15.1.0 (Jun. 2019).

(Continued)

*Primary Examiner* — Kabir A Timory
(74) *Attorney, Agent, or Firm* — Haynes Beffel & Wolfeld, LLP; Ernest J. Beffel, Jr.

(57) ABSTRACT

Disclosed is a method of calibrating phase alignment of signals from multiple transmit antennas on multiple channels during OTA testing of a MIMO DUT, including generating a noisy test signal by adding noise to a signal pattern and transmitting the noisy test signal to the DUT on first and second channels OTA and sweeping a relative phase of the signal pattern, but not the added noise, in the first and second channels, while receiving from the DUT reports of a SNR for a received signal on at least one of the first channel and subsequently on the second channels. The method also includes analyzing variation in the SNR to determine phase alignment of the first and second channels, as received and processed by the DUT and using the determined phase alignment to perform OTA testing of the DUT. The method can also include receiving a RSRP and/or a RSSI.

20 Claims, 5 Drawing Sheets

(56) References Cited

U.S. PATENT DOCUMENTS

2006/0233111 A1* 10/2006 Wright .............. H04B 17/0087
                                                        370/241
2007/0236230 A1   10/2007 Tanbakuchi et al.
2008/0114580 A1    5/2008 Chin et al.
2010/0285753 A1   11/2010 Foegelle

OTHER PUBLICATIONS

3rd Generation Partnership Project; Technical Specification Group Radio Access Network; NR; User Equipment (UE) conformance specification; Radio transmission and reception; Part 4: Performance requirements (Release 16), 3GPP TS 38.521-4 V16.7.0 (Mar. 2021).
U.S. Appl. No. 14/177,165, filed Feb. 20, 2014, U.S. Pat. No. 9,246,607, Jan. 26, 2016.
U.S. Appl. No. 16/430,239, filed Jun. 3, 2019, U.S. Pat. No. 10,587,350, Mar. 10, 2020.
U.S. Appl. No. 15/782,769, filed Oct. 12, 2017, U.S. Pat. No. 10,313,034, Jun. 4, 2019.
U.S. Appl. No. 17/175,545, filed Feb. 12, 2021.

* cited by examiner

MOBILE-ASSISTED PHASE CALIBRATION METHOD AND SYSTEM

PRIORITY

This application claims the benefit of U.S. Provisional Patent Application No. 63/047,894 entitled "MOBILE-ASSISTED PHASE CALIBRATION METHOD AND SYSTEM," filed on 2 Jul. 2020, which is incorporated herein by reference in its entirety.

INCORPORATIONS

The following standard is incorporated by reference in this filing: 3GPP document 38.521-4, "NR User Equipment (UE) conformance specification, Radio transmission and reception, Part 4: Performance".

FIELD OF THE TECHNOLOGY DISCLOSED

The technology disclosed relates generally to a test platform for testing radio communications in a multiple-input multiple-output (MIMO) radio frequency (RF) environment, and more particularly to techniques for phase calibration alignment of signals from multiple transmit antennas on multiple channels during over-the-air (OTA) testing of a MIMO device under test (DUT).

U.S. Pat. No. 9,246,607 "Automatic Phase Calibration", also by inventors John Douglas Reed and Alfonso Rodriguez-Herrera, describes close prior art, and includes descriptions of calculations for phase calibration in a MIMO RF test platform environment, typically known by one skilled in the art.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

In a test platform for testing radio communications in a MIMO RF environment, a multi-path radio channel can be emulated in a channel emulator as multiple delayed copies of a signal transmitted from a signal source, and through multiple signal paths within the test equipment. The test platform needs to ensure that the combined copies of the signal represent the desired test condition. A test platform includes multiple pieces of testing equipment. Because of the connections between pieces of testing equipment and electrical characteristics of each piece of equipment, including relative phase relationships between different components within a piece of testing equipment, there can be phase misalignment between signals throughout the signal paths in the test platform.

An opportunity arises for calibrating a test platform to establish an output phase relationship between different signals as measured by a user equipment.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
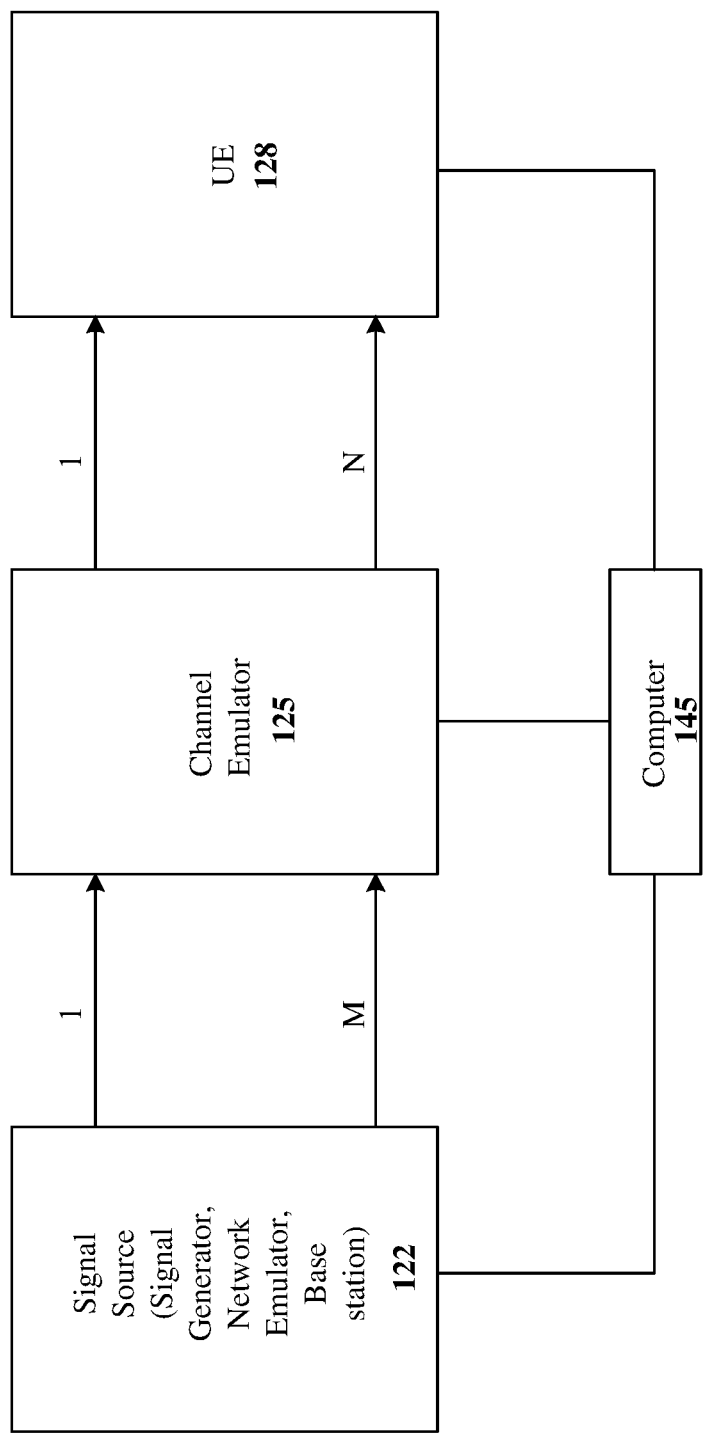
FIG. 1 shows a block diagram of a mobile assisted output phase calibration system for calibrating a test platform to establish an output phase relationship between different signals as measured by user equipment, in a conductive environment.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

These inventors' prior work, primarily for conductive testing but secondarily for over-the-air (OTA) testing, used a measurement device as part of a test apparatus to assure calibrated phase alignment of multiple signals when they reach antenna ports of a device under test (DUT). This application improves on and simplifies testing, with particular application to early 5G handsets that do not implement in hardware the calculations suggested in standard Release 16 of the 3GPP document 38.521-4, "NR User Equipment (UE) conformance specification, Radio transmission and reception, Part 4: Performance".

The technology disclosed leverages measurements that are almost universally available from handsets, takes into account path differences through a handset, and simplifies testing by using readings from the handset instead of requiring use of a separate measurement device as part of the test apparatus.

Acronyms

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, some of them are listed next.

AWGN Additive White Gaussian Noise
CE Channel Emulator
KPI Key Performance Indicator
MMSE Minimum Mean Squared Error
NE Network Emulator
RSRP Reference Signal Received Power
RSSI Received Signal Strength Indicator
SNR Signal to Noise Ratio UE User Equipment
VNA Vector Network Analyzer Mobile devices measure certain properties of the received signal, including the Received Signal Strength Indicator (RSSI), Reference Signal Received Power (RSRP) and Signal to Noise Ratio (SNR) on a per antenna basis. These measurements can be queried and obtained by an external computer.

For testing mobile assisted user equipment in a conductive system, especially multi-antenna equipment, output phase calibration is needed due to the unknown cable length and phase differences. These unknowns make it difficult to implement specific propagation conditions, such as Butler matrices, specific Base Station antenna tapering using gain and phase on each port, ones specified by 3 GPP document 38.521-4 "NR; User Equipment (UE) conformance specification; Radio transmission and reception; Part 4: Performance," and other conditions for which tight phase control is required. The tight phase control improves repeatability of testing results with respect to a Key Performance Indicator (KPI), such as throughput, SNR per antenna, RSRP per antenna, RSSI per antenna, etc.

Traditional methods for phase calibration include the use of a Vector Network Analyzer (VNA) to measure the individual phase for each radio link, so the links can be made coherent by the channel emulator at a given reference plane.

The disclosed technology utilizes explicit feedback from the mobile, also referred to as User Equipment (UE), to achieve output phase calibration when the mobile station feedbacks information (RSRP, RSSI, SNR) per antenna, and the channel emulator responds by modifying either input phases, radio link phases or relative power, or output phases or output powers.

FIG. 1 shows a simplified block diagram of an implementation of a mobile assisted output phase calibration system for calibrating a test platform to establish an output phase relationship between different signals as measured by user equipment, in a conductive environment. The system includes a signal source 122, channel emulator (CE) 125 and user equipment (UE) 128 controlled by a computer 145. Signal sources 122 include a signal generator, network emulator and base station, for example.

As illustrated in the example of FIG. 1, the external computer 145 queries for and obtains properties of the received signal, including the Received Signal Strength Indicator (RSSI), Reference Signal Received Power (RSRP) and Signal to Noise Ratio (SNR) on a per antenna basis. Then the computer 145 implements a disclosed algorithm to calibrate the output phases and other parameters of the channel emulator 125. That is, the channel emulator (CE) 125 responds by modifying input phases, radio link phases or relative power, or output phases or output powers. The channel emulator phases are modified by an algorithm, in response to the measured signals, to obtain and output port phase adjustments so that a desired propagation condition is obtained from signal source to the UE 128. User equipment (UE) and device under test (DUT) are used interchangeably in this document.

Figure 2:
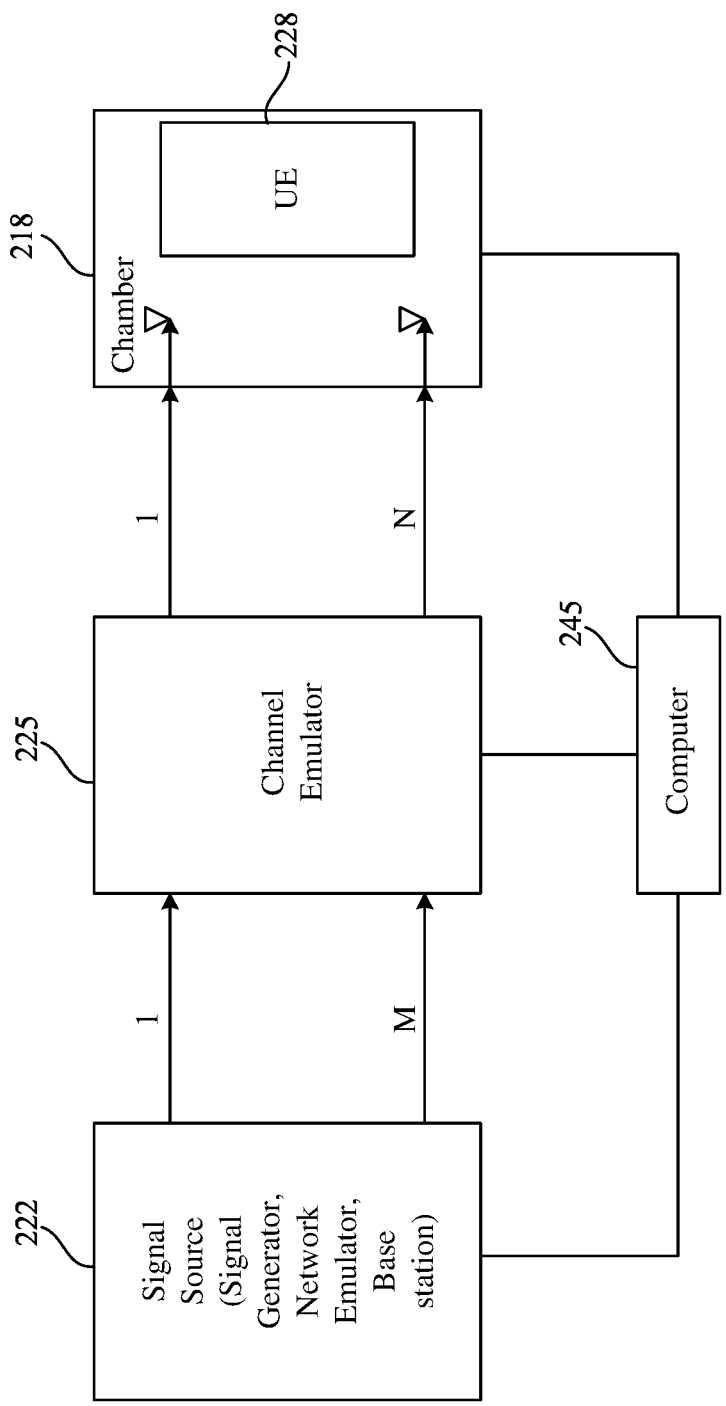
FIG. 2 depicts a block diagram of an over the air (OTA) mobile assisted output phase calibration system for calibrating a test platform to establish an output phase relationship between different signals as measured by user equipment, according to one implementation of the technology disclosed.

FIG. 2 shows a block diagram of an over the air (OTA) mobile assisted output phase calibration system for calibrating a test platform to establish an output phase relationship between different signals as measured by user equipment. The system includes a signal source 222, channel emulator (CE) 225 and user equipment (UE) 228 controlled by a computer 245. Signal sources 222 include a signal generator, network emulator and base station, for example. The connection between the CE 225 and the UE 228 is over the air (OTA).

In the case of OTA, it becomes even more important to implement the disclosed algorithm, as a traditional VNA method cannot be used. This can be used as a substitute for the Radiated Two-Stage method for MIMO OTA performance, without the need for specific signals in the air interface protocol. By lumping the antenna and the complex channel matrix of a shield box 218 together, the UE can be evaluated, but the UE antennas will be calibrated out with the shield box 218, so there can be limitations.

Algorithm Description

The UE 228 is attached to a cellular network (either real or emulated), so the UE 228 can begin measuring RSSI, RSRP, SNR on a per antenna basis.

1. The Channel Emulator (CE) 225 then disables all but two radio links.
2. The computer queries the UE 228 and obtains the measured RSSI, RSRP, SNR for UE antenna port 1.
3. The computer 245 orders the CE 225 to modify the output phase of the second CE port.
4. The computer queries the UE 228 and obtains the measured RSSI, RSRP, SNR for antenna port 1 for the new output phase value.
5. Steps 3 & 4 may be repeated up to N times
6. Based on the 1 to N measurements, the computer 245 calculates the necessary output phase offset for the second CE port so that a peak in measured RSSI, RSRP, SNR for UE antenna port 1. The algorithm can use one or more of KPIs in the phase estimate.
7. Amplitude adjustments may also be implemented based on the measured values.
8. The procedure is repeated for the set of UE antenna ports At the end, the signals are coherent at the demodulation point well within the electronics of the UE 228. At this point, the CE 225 has a fixed phase offset for output ports that create peaks in the KPIs. Now the CE 225 can enact a desired static propagation condition, like Butler matrix, or others as given in appendix B of 3 GPP document 38.521-4NR; User Equipment (UE) conformance specification; Radio transmission and reception; Part 4: Performance.

Figure 3:
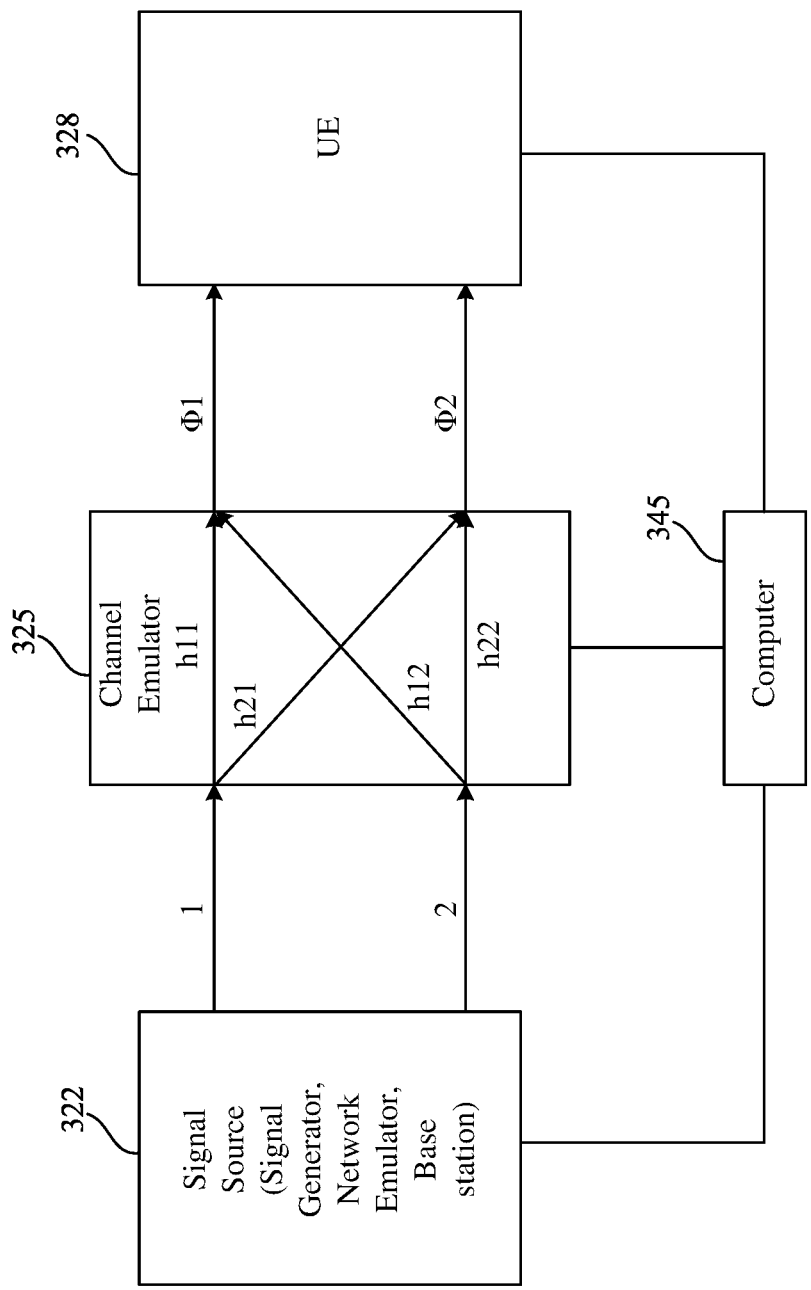
FIG. 3 illustrates a block diagram of a conductive mobile assisted output phase calibration system, for finding the output phase offsets based on signal power using RSRP.

One implementation of this method consists of finding the output phase offsets based on signal power using a single KPI, in this case RSRP. FIG. 3 illustrates a block diagram of a conductive mobile assisted output phase calibration system, for finding the output phase offsets based on signal power using RSRP.

Figure 4:
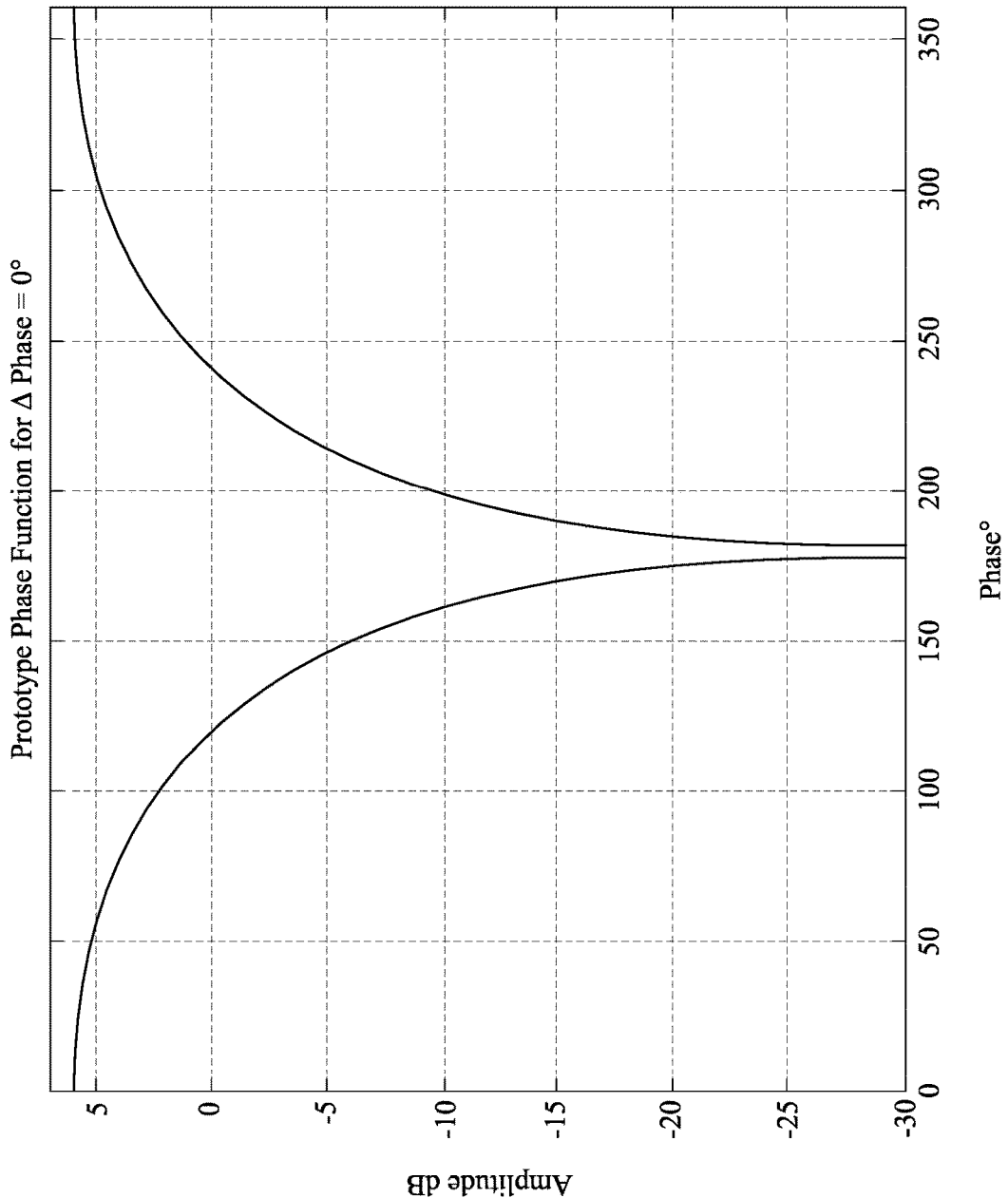
FIG. 4 displays a prototype phase function of phase as a function of amplitude.

In this case, the CE 325 enables Radio Links h11, and h21. Since the signals arriving at the two antenna ports of the UE 328 are equal, then a procedure to find the peak or null in RSRP can be used to calculate the phase offset between the output ports. If the procedure requires the two amplitudes to be equal, then an amplitude calibration step is performed first. This amplitude calibration is enacted by enabling only h11, and ordering an RSRP measurement in antenna port 1, followed by enabling only h21, and ordering an RSRP measurement in antenna port 1. Then the amplitude imbalance $\Delta A$ is calculated as the difference of the two RSRP readings, and the CE 325 compensates for this by lowering the power in the strongest port or increasing the power in the weakest port by the difference $\Delta A$. At this point, the CE 325 enables the Radio Links h11, and h21, and the phase offset between the paths can be found—for example by brute force (that is, checking the phases until a match is obtained), or by using a more intelligent minimum mean squared error (MMSE) algorithm in which a prototype phase is slid over a number of measurements to match the N measured RSRP points and pick the lowest error value. FIG. 4 shows a prototype phase function of phase as a function of amplitude in db.

In a second implementation, a different KPI is used, namely, the SNR per UE port. In this method, as before, the procedure begins with an amplitude calibration. Again, as before, the CE 325 enables Radio Links h11, and h21, and tries to find the peak SNR. But in this case the channel emulator 325 implements a Butler Propagation Matrix. Equation 1 shows an example of a 2×2 Butler Matrix.

$$H = \begin{bmatrix} 1 & 1 \\ 1 & -1 \end{bmatrix} \quad \text{Equation (1)}$$

Figure 5:
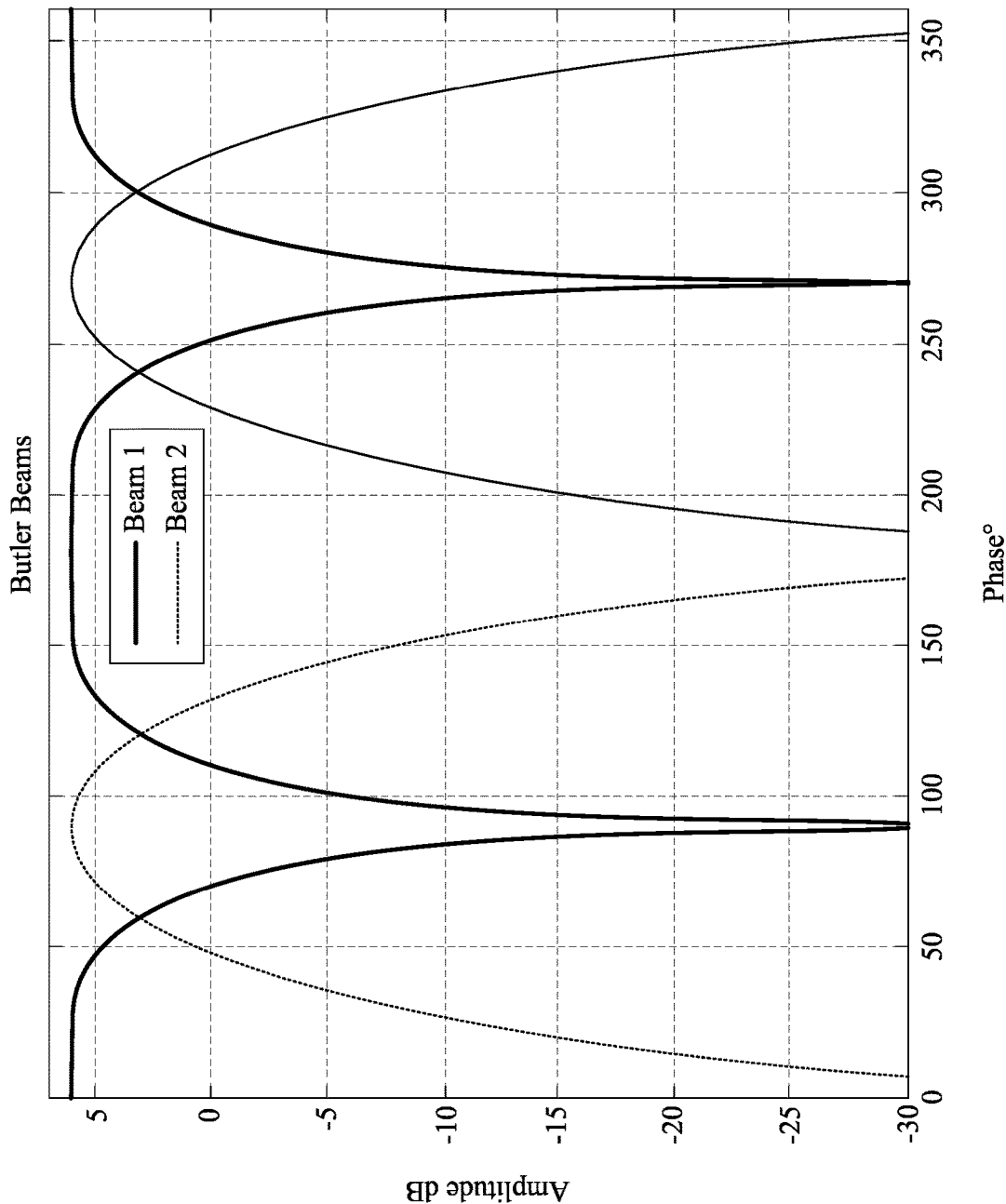
FIG. 5 shows a prototype target function for each of two Butler beams.

As before, the peak SNR per Butler beam can be found by varying the output phase of the CE 325 and measuring the SNR from the UE 328. The same MMSE or brute force algorithms can be used, but the prototype target function is each of the Butler beams shown in FIG. 5 Butler Beams. Notice the property of the Butler beams is that each beam achieves its peak at an angle at which all of the other beams form a null.

In a third example, the two methods described earlier can be combined to produce a more refined estimate for the output phase offsets. One can begin with the method that uses RSRP, use the output phase offsets, and use them as inputs two the method based on SNR. Then the CE 325 beamforms in the direction of Beam 1, and measures the SNR in UE antenna port 1, and then the CE 325 beamforms in the direction of Beam 2 and measures the SNR in the UE antenna port 2. Since the SNR measurements are expected to be equal, any offset can be removed by applying the SNR method.

The methods above can be extended for a system containing M transmit antennas, and N receive antennas by repeatedly applying the method using Radio Link h11, and hn1 with n 2, 3, . . . , N.

A salient feature of the disclosed technology is that the calibration plane is at the inner circuitry of the UE 328, whereas traditional VNA techniques can only move the calibration plane as far as the UE antenna connectors.

In another implementation, the method can combine another KPI, such as per-stream throughput. Under some conditions, the throughput for N streams is expected to be balanced, as the SNR is balanced. Therefore, further output phase refinements can be obtained by observing the data throughput on each data stream and moving the output phases to obtain a balance.

The output phase calibration invention can also be combined with Input Phase Calibration to obtain an end-to-end phase calibration.

Some Particular Implementations

Some particular implementations and features are described in the following paragraphs.

In one implementation, the disclosed technology includes a method of calibrating phase alignment of signals from multiple transmit antennas on multiple channels during over-the-air testing of a MIMO DUT, including generating a noisy test signal by adding noise to a signal pattern and transmitting the noisy test signal to the DUT on first and second channels OTA. The disclosed method also includes sweeping a relative phase of the signal pattern, but not the added noise, in the first and second channels, while receiving from the DUT reports of a SNR for a received signal on at least one of the first channel and subsequently on the second channels and analyzing variation in the SNR to determine phase alignment of the first and second channels, as received and processed by the DUT. The method further includes using the determined phase alignment to perform OTA testing of the DUT.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In some implementations of the disclosed technology, a method of calibrating phase alignment of signals from multiple transmit antennas on multiple channels during OTA" testing of a MIMO device under test includes generating a noisy test signal by adding noise to a signal pattern and transmitting the noisy test signal to the DUT on first and second channels OTA and sweeping a relative phase of the signal pattern, but not the added noise, in the first and second channels, while receiving from the DUT reports of a RSRP or a RSSI, collectively "signal measurement", for a received signal on at least one of the first and second channels. The disclosed method also includes analyzing variation in the signal measurement to determine phase alignment of the first and second channels, as received and processed by the DUT and using the determined phase alignment to perform OTA testing of the DUT.

In one implementation, a disclosed method includes, while sweeping a relative phase of the signal pattern, further receiving from the DUT reports of a reference signal received power, "RSRP" or a received signal strength indicator, "RSSI", for a received signal on at least one of the first and second channels, and combining analysis of variation in the RSRP or RSSI with analysis of variation in the SNR to determine phase alignment of the first and second channels, as received and processed by the DUT. In some implementations, the SNR, RSRP and RSSI are all requested at once for a phase sweep iteration.

For some implementations, the disclosed technology includes a method of calibrating a test platform to establish an output phase relationship between different signals as measured by a user equipment (UE) wherein the channel emulator phases are modified by an algorithm, in response to the measured signals, to obtain and output port phase adjustments so that a desired propagation condition is obtained from signal source to the UE. For some implementations, the output port adjustment includes a phase and amplitude adjustment.

For some implementations, the signal source is a Network Emulator. In other implementations, the signal source is a Base Station.

For some implementations of the disclosed methods, a channel emulator (CE) uses an Additive White Gaussian Noise (AWGN) generator to calibrate the SNR reading in the UE. In other implementations, a CE uses its output power set points to calibrate the RSSI and RSRP readings in the UE.

In some implementations, the disclosed calibrating is executed repeatedly over time to adjust the output phases and compensate for drift.

For some implementations of the disclosed methods, the algorithm is executed for different power levels. In some implementations, the results are stored in a database that can be used to retrieve the output phase offsets for a specific power level.

For some implementations of the disclosed methods, the algorithm is executed after input phase calibration to achieve end-to-end phase calibration.

In one implementation of the disclosed method, the algorithm is executed for different power levels. For some implementations, the results are stored in a database that can be used to retrieve the output phase offsets for a specific power level.

In many implementations of the disclosed method, the algorithm is executed after input phase calibration to achieve end-to-end phase calibration.

In another implementation, a disclosed system includes one or more processors coupled to memory, the memory loaded with computer instructions, when executed on the processors, implement any of the disclosed methods.

Other implementations include tangible non-transitory computer readable storage media loaded with program instructions executed on processors to implement any of the disclosed methods. A tangible non-transitory computer readable medium does not include a transitory wave form.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim:

1. A method of calibrating phase alignment of signals from multiple transmit antennas on multiple channels during over-the-air (OTA) testing of a multiple-input multiple-output (MIMO) device under test, (DUT), including:
    generating a noisy test signal by adding noise to a signal pattern and transmitting the noisy test signal to the DUT on first and second channels OTA;
    sweeping a relative phase of the signal pattern, but not the added noise, in the first and second channels, while receiving from the DUT reports of a signal-to-noise ratio (SNR) for a received signal on at least one of the first channel and subsequently on the second channel;
    analyzing variation in the SNR to determine phase alignment of the first and second channels, as received and processed by the DUT; and
    using the determined phase alignment to perform OTA testing of the DUT.

2. The method of claim 1, further including:
    while sweeping a relative phase of the signal pattern, further receiving from the DUT reports of a reference signal received power (RSRP) or a received signal strength indicator (RSSI), for a received signal on at least one of the first and second channels; and
    combining analysis of variation in the RSRP or RSSI with analysis of variation in the SNR to determine phase alignment of the first and second channels, as received and processed by the DUT.

3. The method of claim 2, wherein the SNR, RSRP and RSSI are all requested at once for a phase sweep iteration.

4. The method of claim 1, wherein the test signal is sourced from a Network Emulator.

5. The method of claim 1, wherein the test signal is sourced from a Base Station.

6. The method of claim 1, wherein a channel emulator (CE) uses an Additive White Gaussian Noise (AWGN) generator to calibrate the SNR reading in the DUT.

7. A method of calibrating phase alignment of signals from multiple transmit antennas on multiple channels during over-the-air (OTA) testing of a multiple-input multiple-output (MIMO) device under test, (DUT), including:
    generating a noisy test signal by adding noise to a signal pattern and transmitting the noisy test signal to the DUT on first and second channels OTA;
    sweeping a relative phase of the signal pattern, but not the added noise, in the first and second channels, while receiving from the DUT reports of a reference signal received power (RSRP) or a received signal strength indicator (RSSI), collectively signal measurement, for a received signal on at least one of the first and second channels;
    analyzing variation in the signal measurement to determine phase alignment of the first and second channels, as received and processed by the DUT; and
    using the determined phase alignment to perform OTA testing of the DUT.

8. The method of claim 7, wherein the test signal is sourced from a Network Emulator.

9. The method of claim 7, wherein the test signal is sourced from a Base Station.

10. The method of claim 7, wherein a channel emulator (CE) uses its output power set points to calibrate the RSSI and RSRP readings in the DUT.

11. A tangible non-transitory computer readable storage media, loaded with program instructions that, when executed on processors, cause the processors to implement a method of calibrating phase alignment of signals from multiple transmit antennas on multiple channels during over-the-air (OTA) testing of a multiple-input multiple-output (MIMO) device under test (DUT), the method including:
    generating a noisy test signal by adding noise to a signal pattern and transmitting the noisy test signal to the DUT on first and second channels OTA;
    sweeping a relative phase of the signal pattern, but not the added noise, in the first and second channels, while receiving from the DUT reports of a signal-to-noise ratio (SNR) for a received signal on at least one of the first channel and subsequently on the second channel;
    analyzing variation in the SNR to determine phase alignment of the first and second channels, as received and processed by the DUT; and
    using the determined phase alignment to perform OTA testing of the DUT.

12. The tangible non-transitory computer readable storage media of claim 11, further including:
    while sweeping a relative phase of the signal pattern, further receiving from the DUT reports of a reference signal received power (RSRP) or a received signal strength indicator (RSSI), for a received signal on at least one of the first and second channels; and
    combining analysis of variation in the RSRP or RSSI with analysis of variation in the SNR to determine phase alignment of the first and second channels, as received and processed by the DUT.

13. The tangible non-transitory computer readable storage media of claim 12, wherein the SNR, RSRP and RSSI are all requested at once for a phase sweep iteration.

14. A system for calibrating phase alignment of signals from multiple transmit antennas on multiple channels during over-the-air (OTA) testing of a multiple-input multiple-output (MIMO) device under test (DUT), the system including a processor, memory coupled to the processor and computer instructions from the non-transitory computer readable storage media of claim 11 loaded into the memory.

15. The system of claim 14, wherein the test signal is sourced from a Network Emulator.

16. The system of claim 14, wherein the test signal is sourced from a Base Station.

17. A tangible non-transitory computer readable storage media, loaded with program instructions that, when executed on processors, cause the processors to implement a method of calibrating phase alignment of signals from multiple transmit antennas on multiple channels during over-the-air (OTA) testing of a multiple-input multiple-output (MIMO) device under test (DUT), the method including:
   generating a noisy test signal by adding noise to a signal pattern and transmitting the noisy test signal to the DUT on first and second channels OTA;
   sweeping a relative phase of the signal pattern, but not the added noise, in the first and second channels, while receiving from the DUT reports of a reference signal received power (RSRP) or a received signal strength indicator (RSSI), collectively signal measurement, for a received signal on at least one of the first and second channels;
   analyzing variation in the signal measurement to determine phase alignment of the first and second channels, as received and processed by the DUT; and
   using the determined phase alignment to perform OTA testing of the DUT.

18. A system for calibrating phase alignment of signals from multiple transmit antennas on multiple channels during over-the-air (OTA) testing of a multiple-input multiple-output (MIMO) device under test (DUT), the system including a processor, memory coupled to the processor and computer instructions from the non-transitory computer readable storage media of claim 17 loaded into the memory.

19. The system of claim 18, further configurable to carry out a method including:
   while sweeping a relative phase of the signal pattern, further receiving from the DUT reports of a reference signal received power (RSRP) or a received signal strength indicator (RSSI), for a received signal on at least one of the first and second channels; and
   combining analysis of variation in the RSRP or RSSI with analysis of variation in the SNR to determine phase alignment of the first and second channels, as received and processed by the DUT.

20. The system of claim 19, wherein the SNR, RSRP and RSSI are all requested at once for a phase sweep iteration.

* * * * *